Aug. 15, 1967         R. B. NELSON         3,336,481
       COLOR GRADING APPARATUS WITH TEMPERATURE
       SENSOR TO COMPENSATE FOR LAMP BRIGHTNESS
Filed Feb. 21, 1963                3 Sheets-Sheet 1
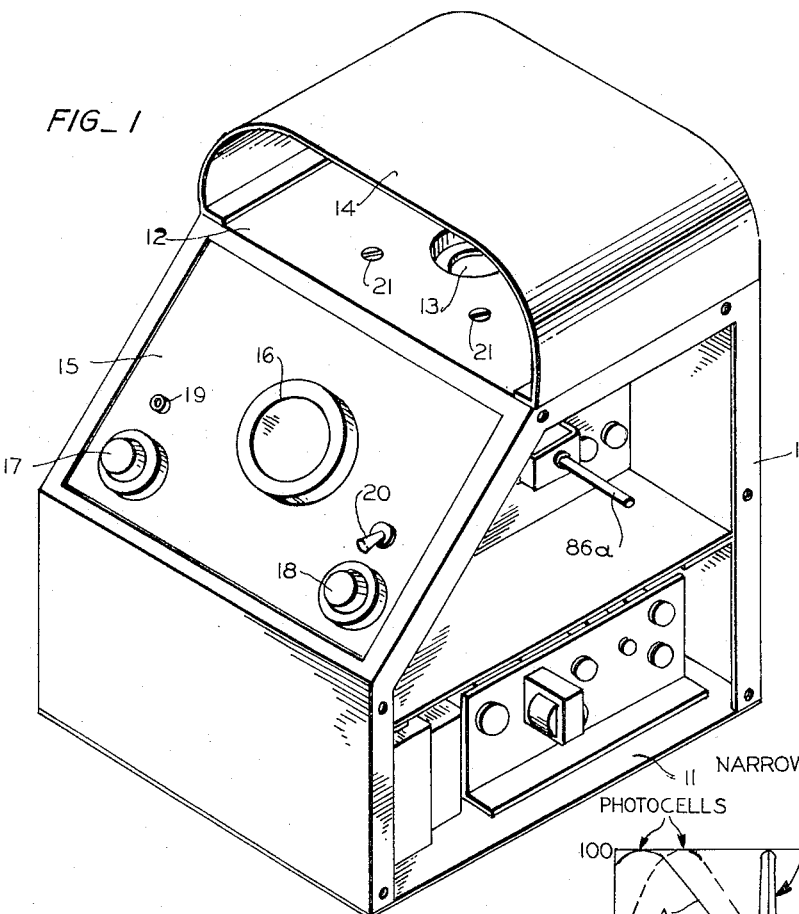
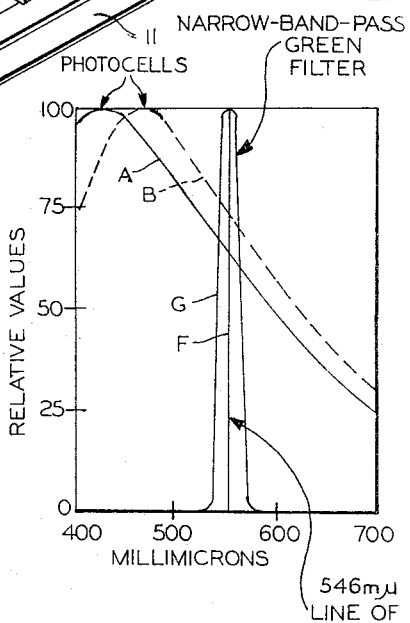
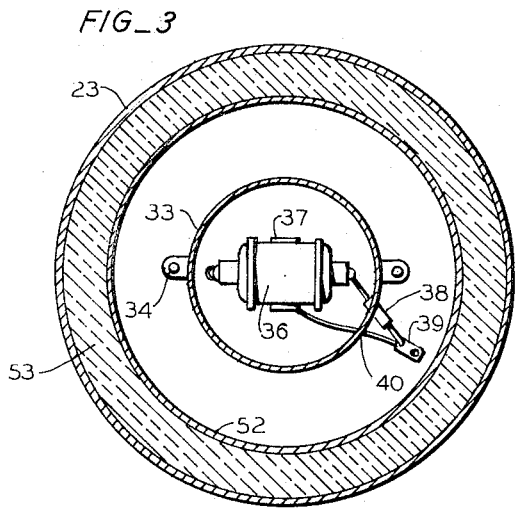
INVENTOR.
RICHARD B. NELSON
BY
ATTORNEYS Aug. 15, 1967
R. B. NELSON
3,336,481
COLOR GRADING APPARATUS WITH TEMPERATURE
SENSOR TO COMPENSATE FOR LAMP BRIGHTNESS
Filed Feb. 21, 1963
3 Sheets-Sheet 2
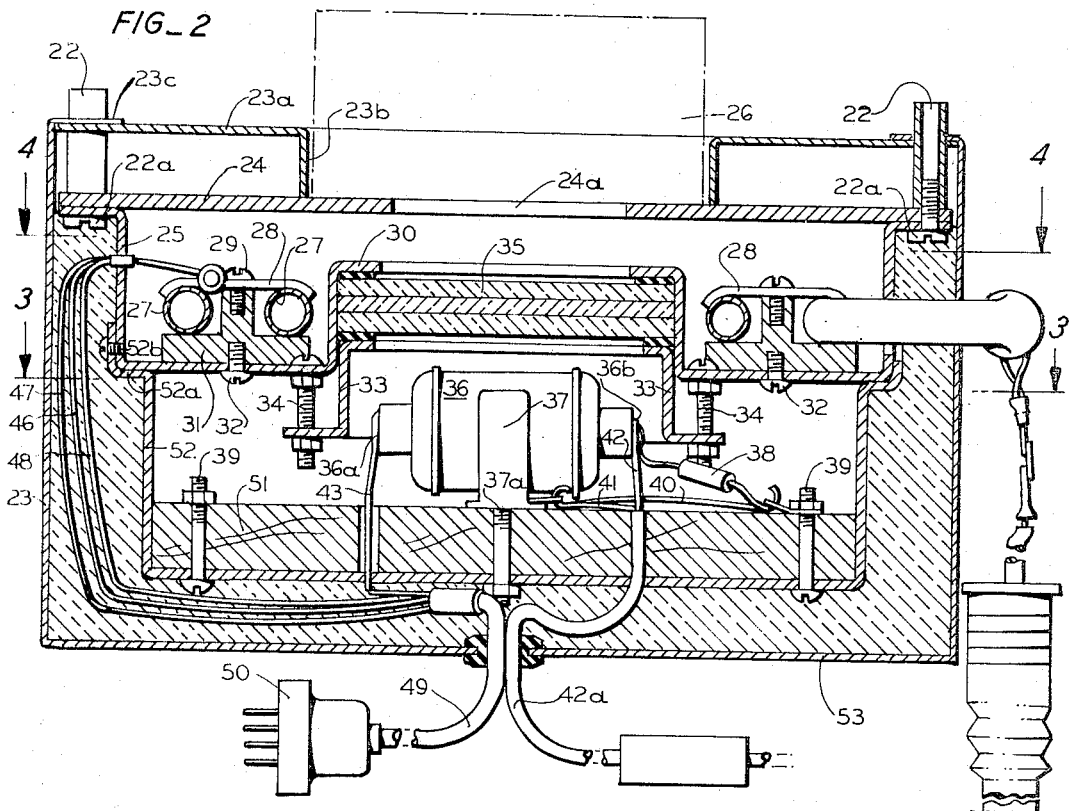
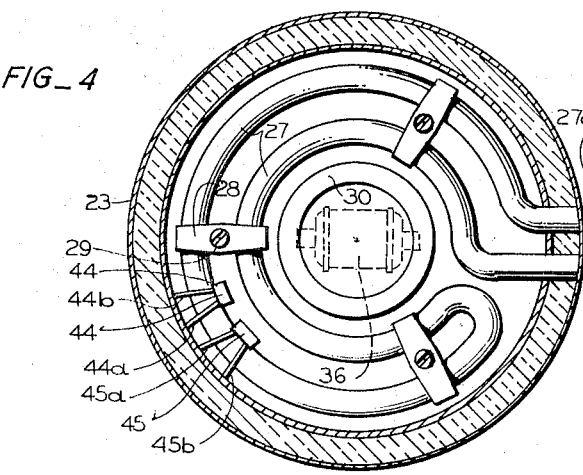
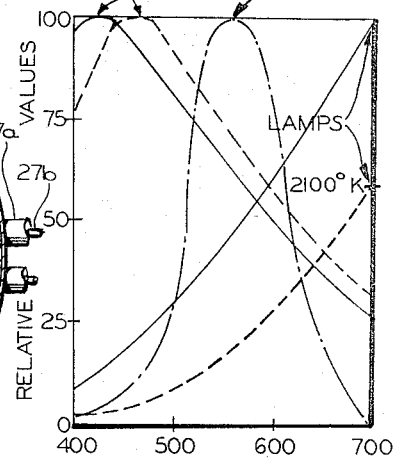
INVENTOR.
RICHARD B. NELSON
BY
*Allen and Chromy*
ATTORNEYS

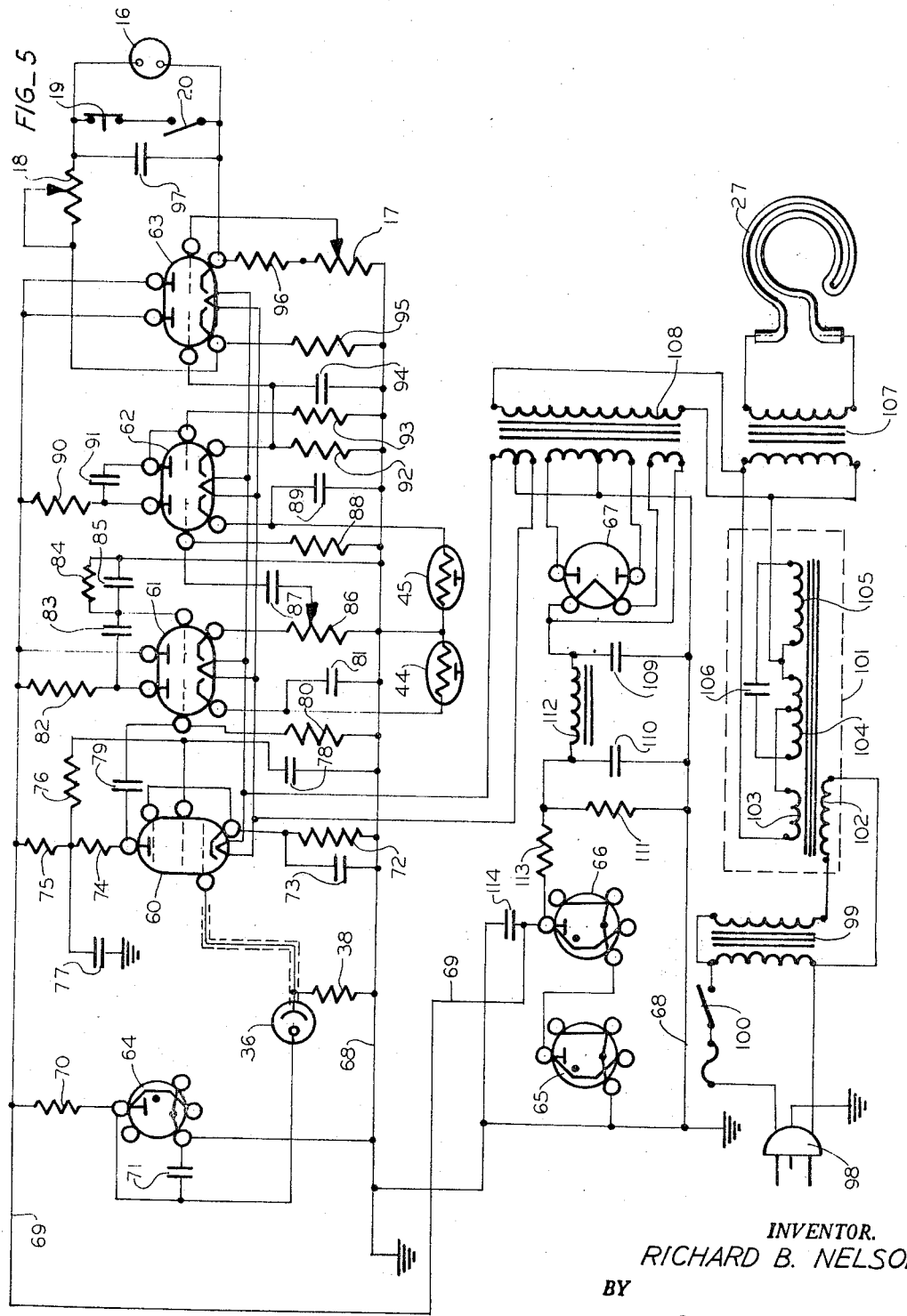

United States Patent Office 3,336,481
Patented Aug. 15, 1967

3,336,481
COLOR GRADING APPARATUS WITH TEMPERATURE SENSOR TO COMPENSATE FOR LAMP BRIGHTNESS
Richard B. Nelson, Cloverdale, Calif., assignor of one-half to Genevieve I. Magnuson, Saratoga, Calif., and one-half to Genevieve I. Magnuson, Robert Magnuson, and Lois J. Fox, trustees of the estate of Roy M. Magnuson
Filed Feb. 21, 1963, Ser. No. 260,115
3 Claims. (Cl. 250—226)

This invention relates to color grading of products such as food products in general. More particularly, this invention relates to a simplified method and apparatus whereby commercial grading of various products can be reliably performed with reproduceable results.

This application is an improvement over the invention disclosed and claimed in an application of Traver J. Smith, Ser. No. 494,783, now abandoned, assigned to a common assignee.

An object of this invention is to provide an improved color grading apparatus and method whereby commercial color grading of various products can be obtained in the field by relatively unskilled operators.

Still another object of this invention is to provide an improved color grading apparatus in which provision is made for compensation for changes in brightness of the light source employed.

A further object of this invention is to provide an improved color grading apparatus in which provision is made for heat insulation of the light source of the apparatus to maintain the temperature of the light source from rapid fluctuations.

Still another object of this invention is to provide an improved color grading instrument in which thermistor type resistors are provided in the cathodes of several stages of the amplifier employed in the instrument for controlling the positive potentials of said cathodes in accordance with the temperature of the light source of the instrument.

Still another object of this invention is to provide an improved color grading instrument in which the light source is positioned inside of a heat insulated housing, together with the light sensitive cell of the instrument, and in which the said housing enclosing the light source, light sensitive cell and input resistor of the amplifier forms a unitary construction which may be readily detached from the instrument for servicing when required.

Color grading instruments manufactured in accordance with this invention give reproducible results in color measurements because monochromatic reflectance comparisons are made. Reproducible results are obtained even though the spectral sensitivity of commercially available photoelectric cells varies widely and the spectral transmittance of glass filters also varies. This invention employs a truly monochromatic light since the band width of the light used to generate the signal is confined to the selected line or lines generated by the light source. It is therefore possible to make the characteristics of the light source, a light-sensitive photoelectric cell and filter of each instrument match in any given monochromatic region simply by adjusting the sensitivity of the amplifier. It is, of course, necessary that the amplification characteristics of the amplifier be linear in order that all instruments produced in accordance with this invention read alike under any given set of conditions.

Further details of this invention will be set forth in the following specification, claims and drawing, in which, briefly:

FIG. 1 is a perspective view of an embodiment of this apparatus with the side panel removed to show the positioning of the amplifier and power supply therein;

FIG. 2 is a sectional view of the heat insulated housing enclosing the light generating tube, light sensitive cell and amplifier input resistor therein;

FIG. 3 is a sectional view taken along the line 3—3 of FIG. 2 showing the position of the light sensitive cell in the housing;

FIG. 4 is a sectional view taken along the line 4—4 of FIG. 2, showing the light generating tube positioned in the housing;

FIG. 5 is a schematic wiring diagram of this apparatus;

FIG. 6 shows graphs illustrating range of variations in response of light-sensitive or photoelectric cells of a given type and it also shows variation of light intensity produced by a conventional incandescent lamp type light source at different filament temperatures; the band width of a green filter in relation to the other graphs is also shown; and FIG. 7 is a graph used to illustrate the range of response characteristics of a light-sensitive cell of commercial type shown in relation with a narrow band pass green filter and the 546 millimicron line of mercury.

Referring to the drawing in detail, there is shown in FIG. 1 a perspective view of an embodiment of this apparatus with the side panel removed. The apparatus is provided with a frame 10 to which the bottom 11 is attached and which is provided with a top panel 12 having an aperture 13 therein for receiving the container for the specimen to be color graded. A cover 14 which is in the shape of a canopy is attached to the sides and back of the top panel 12 and arches over this panel so as to form a light screen and protective member. The forward part of the frame is tilted and the insulation panel 15 is attached to this tilted portion. A suitable meter or indicating instrument 16 which will be described hereinafter is positioned in the central part of the panel and potentiometers 17 and 18 are positioned in the lower corners thereof so that the controls for these potentiometers extend to the front of the panel. Switches 19 and 20 are also positioned on the panel and these parts will be described in detail in connection with the description of the circuit diagram shown in FIG. 5.

The housing 23 shown in FIGS. 2, 3 and 4, for the light source 27 and for the light sensitive cell 36 is provided with tabs 23c which overlap the top 23a of the housing. This housing is supported underneath the top panel 12 by means of the screws 21 which are threaded into the sleeves 22. These sleeves extend through the tabs 23c and panel 23a down to the panel 24 and machine screws 22a are threaded into the sleeves from the bottom thereof through suitable holes formed in the panel 24 and wall member 25.

The top of the light housing 23a is provided with a central well that is formed by the member 23b which is of annular shape. The anular member 23b is formed out of the central portion of the top 23a and extends to the panel 24 so that a space is formed between the top and the panel 24. This space may be filled with heat insulating material such as glass wool or the like. The inner surface of the annular member 23b is painted with a dull black paint so as to reduce light reflection. The edge of the hole 24a in the panel 24 is likewise painted with a dull black paint for the same purpose. The container 26 for the sample to be color graded is positioned in the well formed by the annular member 23b and the panel 24 so that the bottom of this container is exposed in the hole 24a to light produced by the light generating tube 27. This tube 27 is formed out of suitable glass, Pyrex, fused quartz or other vitreous material and is bent back upon itself in the configuration shown in FIG. 4. It is roughly of doughnut shape and is positioned in the annular cavity formed in the wall member 25.

Clamps 28 which are attached by the screws 29 to the supporting members 31 are provided for holding the light generating tube 27 in position in the aforesaid cavity. A hole is provided in the center of the member 25 substantially in alignment with the hole 24a in the panel 24 and filters 35 are clamped against the member 30 by the member 33 which is attached to the member 25 by means of the screws 34. Suitable gaskets are provided between the members 30, 33 and the filters 35. Where the light generating device 27 is a source of white light for grading white material which may be different slightly grey shades, it is not necessary to use the filters 35.

Where this color grading instrument is to be used for color grading raw or processed tomato juice or pulp, malt, cereal products such as corn flakes, bran flakes, rice flakes, etc., capsicum, spices and orange juice and pulp products, the light generating tube 27 is a conventional mercury vapor electric discharge tube which generates persistent spectrum lines at 404.1, 435.8, and 546.1 millimicrons and other minor lines. In this case, the glass filters 35 isolate the 546.1 millimicron green line from the light reflected by the selected sample mentioned above positioned in the cup 26 and this line is passed to the light sensitive cell 36. On the other hand, the filters 35 may be used to pass only the 435.8 millimicron blue line of mercury and this blue line has been successfully used for color grading toasted products such as cookies and crackers, for example. For color grading of ground coffee and also some cereal products, such as, corn flakes and rice flakes, etc., this instrument is equipped with a light generating tube 27 which has a rarified atmosphere of neon gas and is similar to the conventional neon light type of tube. In this case the filters 35 pass predominantly the 640.2 millimicron red line of neon and also pass, to a certain extent, the 650.6 and 659.9 millimicron lines of neon which are further in the red region of the spectrum but are of less intensity than the 640.2 millimicron line. In this case also the light sensitive cell or phototube 36 is provided with a characteristic which cuts off very rapidly in the red region beyond the 640.2 millimicron red line so that it is much less responsive to the 650.6 and 659.9 millicron lines. On the other hand, where this apparatus is to be used for grading lemons to detect the greeness thereof due to the presence of chlorophyll which has an absorption peak at 675 millimicrons, the light filters 35 employed are such that they predominantly pass the 650.6 and 659.9 millimicron lines.

In FIG. 6 there are shown two curves A and B which illustrate how the characeristics of commercially available photoelectric cells may vary. Curves C and D show how the light output of conventional incandescent lamps varies depending upon the temperature of the filament thereof which is influenced by the voltage applied thereto. These curves are related to the green filter curve E. From curves A and B it is seen that commercially available photoelectric cells may vary considerably in their light response characteristics, and from curves C and D it is seen that the intensity of the light output of the incandescent lamp, when operated at different voltages varies considerably in the region between approximately 500 millimicrons and 600 millimicrons embraced by the curve of the green filter, as shown by curve E. The graphs shown in FIG. 7 illustrate the conditions that are obtained in applicant's invention in which a narrow band pass green filter having the characteristic shown by the curve G is employed for the purpose of selecting only the green 546 millimicron line of mercury band F. With this arrangement it is possible to obtain instruments giving reproducible results even though light-sensitive cells, varying in response characteristics between the limits shown by curves A and B are employed, and this may be obtained simply by adjusting the gain control of the linear response amplifier. Curves similar to those shown in FIG. 7 may be obtained by using the different spectrum lines selected in accordance with this invention, as will be described hereinafter.

The light sensitive cell 36 is supported by the U-shaped clip 37 which is attached to the board 51 and the bottom of the member 52 by means of the screw 37a. The phototube or cell 36 is positioned directly below the filters 35. The terminal 36a of the light sensitive cell 36 is connected to the conductor 43 and terminal 36b is connected to one end of the resistor 38 and to the shielded conductor 42. The other end of the resistor 38 is connected to ground as represented by the metal chassis of the instrument by means of the screw 39 and insulated conductors 40 and 41. These conductors are also connected to the clip 37 and the conductor 41 forms the shield enclosing conductor 42 in the cable 42a which is led out of the bottom of the housing 23a through a suitable grommet.

The thermistors 44 and 45 shown in FIG. 4 are positioned adjacent to the gas discharge tube 27 so that they are heated thereby. The thermistor leads 44a and 45a are connected together to the insulated conductor 46 and thermistor leads 44b and 45b are connected to the insulated conductors 47 and 48 respectively. These conductors are grouped into the cable 49 and fed out of the housing 23 through a suitable grommet together with the cable 42a as shown in FIG. 2. A suitable plug 50 with connecting pins is provided to the end of the cable 49 so that the thermistors may be connected into the amplifier circuit shown in FIG. 5.

The space inside of the housing 23 between it and the wall members 25 and 52 is filled with a glass wool or fibreglass insulation so that the temperature of the gas discharge lamp 27 is maintained against rapid fluctuation. The space between the top walls 23a and 24 may also be filled with glass wool or other suitable insulation if desired.

The schematic diagram of connections of the electrical parts of this apparatus is shown in FIG. 5. The light sensitive cell 36, which may be of the type 926 with S–3 spectral response, is connected with the cathode thereof to the control grid of pentode amplifier tube 60 which may be of the type EF–86 or type 6267. A suitable shielded conductor is provided for connecting the cathode of the light sensitive cell 36 to control grid of amplifier tube 60 and this shielded conductor is designated by reference numeral 42 in FIG. 2. The grid resistor 38, one end of which is connected to the cathode of light sensitive cell 36 and to the control grid of amplifier tube 60 and the other end of which is connected to the chassis of the apparatus, is positioned next to the light sensitive cell or tube 36 in the light housing shown in FIG. 2. Inasmuch as this resistor is replaced whenever the light sensitive cell is replaced this arrangement simplifies such replacement. Thus resistor 38 is connected between the cathode of the light sensitive cell and ground as represented by the metal chassis of this instrument 68, to which the negative terminal of the power supply is also connected. The anode of the light sensitive cell 36 is connected to the positive line 69 of the power supply through the resistor 70. Thus when the cell 36 is energized by light impinging thereon current flows through the resistor 70, the light sensitive cell 36 and resistor 38 between the positive line 69 and the negative ground line 68, and the voltage drop across resistor 38 forms the signal applied to the control grid of amplifier tube 60. A filter capacitor 71 is connected across the voltage regulator tube 64 and this tube is connected between the negative line 68 and the bottom terminal of the resistor 70 so that it functions as a voltage regulator for the voltage supplied to the light sensitive cell 36.

A resistor 72 is connected between the cathode of the amplifier tube 60 and the ground line 68 to provide bias to this cathode and a capacitor 73 is connected across this resistor. Resistors 74 and 75 are connected in series between the anode of the amplifier tube 60 and the positive line 69 and a capacitor 77 connected between the common terminal of these resistors 74 and 75 and the ground line 68. Another resistor 76 is connected with its left hand terminal to the common terminal of resistors 74 and 75 and the right hand terminal of this resistor 76 is connected to the upper terminal of the capacitor 78, the lower terminal of which is connected to the ground line 68. The screen grid of the amplifier tube 60 is connected to the common connection between the resistor 76 and capacitor 78 so that a suitable positive potential is applied to this grid through this connection. The suppressor grid of this tube 60, which is the grid shown below the anode, is connected to the cathode.

Amplifier 61 is a dual triode type tube and each of the sections of this tube is provided with a cathode, a control grid and an anode. The control grid of the left hand section is coupled through capacitor 79 to the anode of tube 60 and a grid resistor 80 is also connected between this grid and the ground line 68. The cathode of the first section of amplifier tube 61 is connected to the ground line 68 through the thermistor 44 which is shunted by the capacitor 81. A similar thermistor 45 is connected between the ground line 68 and the cathode of the first section of tube 62 which is also a dual triode. Thermistor 45 is shunted by a capacitor 89. These thermistors function to provide bias voltage to these cathodes with reference to the negative line 68. Resistor 82 is connected between the anode of the first section of tube 61 and the positive or anode supply line 69.

The second section of amplifier tube 61 is connected as a cathode follower and the control grid of this section is coupled through the capacitor 83 to the anode of the first section. A high resistance grid resistor 84 is connected between the control grid of the second section of tube 61 and the ground line 68. This grid resistor is shunted by a capacitor 85. The upper terminal of the gain control potentiometer 86 is connected to the cathode of the second section of tube 61 and the lower terminal of the potentiometer 86 is connected to the ground line 68, while the variable contactor of this device is connected to a lower terminal of the capacitor 87 which couples it to the control grid of the first section of amplifier 62. This gain control is provided with a shaft 86a shown in FIG. 1, so that it may be adjusted from the side of the instrument. A grid resistor 88 is provided between the control grid of tube 62 and the ground line 68, and resistor 90 is connected between the anode supply line 69 and the anode of this first section.

The second section of the dual triode 62 is connected as a rectifier with the grid and anode thereof connected together and coupled to the anode of the first section through the capacitor 91. A resistor 93 is provided with the bottom terminal thereof connected to the ground line 68 and the upper terminal thereof connected to the grid and anode of the second section of tube 62, and a resistor 92 is provided between the cathode of this section and the ground line 68. The cathode of this second section is also connected to the control grid of the dual triode 63 and a capacitor 94 is connected between the control of this first section and the ground line 68. The dual triode 63 is connected to form two legs of a Wheatstone bridge and the anodes thereof are connected together and to the anode supply line 69. The third leg of this bridge is formed by the resistor 95, which is connected between the cathode of the first section of dual triode 63 and the ground line 68, and the fourth leg of this bridge is formed by resistor 96 and potentiometer 17 which are connected in series between the cathode of the second section of dual triode 63 and the ground line 68. The variable contactor of potentiometer 17 is connected to the control grid of the second section of triode 63. Potentiometer 17 is referred to as the "zero" potentiometer. Potentiometer 18, which is connected between the cathode of the first section of dual triode 63 and the upper terminal of the indicating meter 16, is referred to as the "standardize" potentimeter. The variable contactor of this potentiometer is connected to the left hand terminal thereof. A push button switch 19 and a toggle switch 20 are connected in series across the meter 16, and also across the capacitor 97 which is provided to the meter circuit.

The power supply is provided with a plug 98 of conventional design which is adapted to be used in connection with the usual 117 volt A.C. supply circuit whereby the primary of the auto transformer 99 is adapted to be connected to such a circuit through the switch 99 and a suitable fuse. The secondary of the auto transformer is connected to the primary 102 of the constant voltage transformer 101. This transformer is provided with secondary windings 103, 104 and 105 and capacitor 106 which are interconnected as shown in the drawing. The left hand terminal of secondary 103 and the common connection between secondaries 104 and 105 provide outlets from this constant voltage transformer which are connected to supply the primary of transformer of 107 and the primary of transformer 108. The secondary of transformer 107 supplies a suitable high voltage to energize the light generating tube 27 which may be of the gas discharge type. Three secondaries are provided to the transformer 108. The upper one of these secondaries is a low voltage winding which provides the heater current to amplifier tubes 60, 61, 62 and 63 and the lower secondary is also a low voltage winding which supplies the filament current to the rectifier tube 67. The intermediate secondary winding supplies the anode voltage for the light sensitive cell 36 and the various tubes 60–63 inclusive. The terminals of the intermediate secondary winding are connected to the respective anodes of the full wave rectifier 67 and the center tap of this secondary winding is connected to the center tap of the upper secondary winding and to the lower terminals of capacitors 109 and 110 and resistor 111. The upper terminal of the capacitor 109 is connected to the cathode of the rectifier tube 67 and to the right hand terminal of the choke coil 112. The left hand terminal of this choke coil is connected to the upper terminal of the capacitor 110 and to the upper terminal of resistor 111, as well as to the right hand terminal of resistor 113. The left hand terminal of resistor 113 is connected to the anode of voltage regulator tube 66 and to the line 69, as well as to the lower terminal of capacitor 114. The upper terminal of this capacitor is connected to ground and to a cathode of voltage regulator tube 65, the anode of which is connected to the cathode of voltage regulator tube 66.

The operation of this apparatus is as follows: Before using the instrument for color grading it is calibrated, for example, by using two gray calibration disks one of which is a little darker and the other a little lighter than the desired shades of the product to be tested. These disks are made of non-fading mineral pigmented polystyrene plastic and the bottom surface thereof is polished to provide a reflectance surface. In the calibration of the instrument the value of the potentiometer 18 which is sometimes referred to as the "standardize" control is set at its maximum resistance. Thereafter, the darker calibration disk is placed directly over the opening 24a and potentiometer 17 which is sometimes referred to as the "zero" control is adjusted so that the meter 16 reads "0." The darker disk is then replaced with the lighter disk and potentiometer 18 is adjusted to make the meter 16 read "100" or full scale deflection. The foregoing procedure adjusts the instrument so that samples to be color graded should fall between "0" and "100" on the meter 16. That is, the darker samples will read closer to "0" and the lighter samples will read up to "100." Also by using this procedure the instrument can be calibrated so that differences in color shades which are hardly perceptible to the human eye can be spread out or magnified so as to appear over substantial parts of the scale of the meter 16.

After the instrument is adjusted as described above, the products to be color graded are simply placed into the container 26 one at a time and readings taken off of the meter 16 to show whether the product falls within the range of the scale of meter 16, and if so, whether it is light or dark within the acceptable range. This procedure is followed in the making reflectance measurements of opaque products. Where transmission measurements of translucent products are to be made the following procedure is used. A spacer ring having a width that is precisely controlled to give a uniform layer of thickness is placed into the bottom part of the container 26. Enough of the product to be tested is then placed into container 26 to completely cover the spacer ring. Thereafter, a special calibration disk which fits inside of the sample cup 26 is placed above the spacer ring so that the reflecting surface thereof is completely immersed in the product and all air pockets and bubbles are removed from the product and from the reflectance surface of this special disk. The cup 26 and the product with the special disk thereover is then placed into the well of the instrument centered over the hole 24a. The meter 16 is then read to obtain the transmission measurement desired.

While I have shown and described a preferred embodiment of the invention, it is apparent that the invention is capable of variation and modification from the form shown so that the scope thereof should be limited only by the scope of the claims appended hereto.

What I claim is:

1. In color grading apparatus the combination of an electric discharge device comprising an elongated vitreous tube having an atmosphere of rarified gas, said tube being of substantially circular shape, a housing, a wall member extending across said housing and forming an annular cavity for said tube, said housing comprising outer wall structure and inner wall structure spaced therefrom, heat insulating material positioned between said wall structures, said wall member having a hole therethrough substantially in the central part thereof, light filter means positioned in alignment with said hole for selecting substantially monochromatic lines from the light produced by said electric discharge device, said housing having top wall structure defining a well into which the sample to be color graded is inserted, the bottom of said well being open so that light produced by said electric discharge device impinges said sample and is reflected from said sample into said hole and filter means, a light sensitive cell positioned under said filter means to receive light reflected from said sample and passing through said filter means, an amplifier having a plurality of stages, said amplifier having the input thereof connected to said light sensitive cell, an indicating device connected to the output of said amplifier for indicating the magnitude of light energization of said cell, and means connected to the cathode circuit of one of said amplifier stages for controlling the cathode bias of said stage inversely in accordance with the temperature of said electric discharge device.

2. In color grading apparatus the combination of an electrically energized light generating device for illuminating a sample being color graded, said device comprising an elongated vitreous tube having means for making electrical connections thereto, a light sensitive cell positioned to receive light reflected from the sample being color graded, an amplifier comprising a plurality of stages having the input circuit thereof connected to said light sensitive cell, said input circuit including a resistor that is common to the input stage and to said light sensitive cell, an indicating device, a bridge circuit having one leg thereof connected to the output of said amplifier, means including a variable resistor for connecting said indicating device across said bridge circuit, said bridge circuit comprising four legs, two of which comprise a dual triode and the other two of which each comprise a resistor, one of which is variable for setting the zero of said indicating device, a constant voltage transformer connected to energize said light generating device, means connected to said transformer for supplying electrical potentials to said light sensitive cell and to said amplifier, temperature sensitive resistor means having a negative resistance-temperature coefficient connected to said amplifier, said resistor means being positioned adjacent to said light generating device so that the sensitivity of said amplifier is increased as the temperature of said light generating device increases to compensate for changes in brightness of the light output of said generating device.

3. In color grading apparatus the combination of an electric discharge device comprising an elongated vitreous tube having an atmosphere of rarified gas, said tube being of substantially circular shape, a housing, a wall member extending across said housing and forming an annular cavity for said tube, said housing comprising outer wall structure and inner wall structure spaced therefrom, heat insulating material positioned between said wall structures, said wall member having a hole therethrough substantially in the central part thereof, light filter means positioned in alignment with said hole for selecting substantially monochromatic lines from the light produced by said electric discharge device, said housing having top wall structure defining a well into which the sample to be color graded is inserted, the bottom of said well being open so that light produced by said electric discharge device impinges said sample and is reflected from said sample into said hole and filter means, a light sensitive cell positioned under said filter means to receive light reflected from said sample and passing through said filter means, an amplifier having a plurality of stages, said amplifier having the input thereof connected to said light sensitive cell, an indicating device connected to the output of said amplifier for indicating the magnitude of light energization of said cell, and means connected to the cathode circuit of at least one of said amplifier stages for controlling the cathode bias thereof, said last mentioned means comprising temperature sensitive resistor means having a negative resistance-temperature coefficient, said resistor means being positioned adjacent to said light generating device so that the sensitivity of said amplifier is increased as the temperature of said light generating device increases to compensate for changes in brightness of the light output of said generating device.

References Cited

UNITED STATES PATENTS

| | | | |
|---|---|---|---|
| 2,178,211 | 10/1939 | Nolan | 250—226 X |
| 2,483,875 | 10/1949 | Boyer | 250—226 X |
| 3,045,125 | 7/1962 | Mason | 250—238 |

OTHER REFERENCES

Magnuson Engineers, Inc.: "Model F Agtron Technical Description," Magnuson Engineers, Inc., San Jose, Calif., AF–14.2, Mar. 17, 1958.

Smith et al.: "Tomato Classification," Electronics, vol. 25, No. 1, pp. 92 to 94, January 1952.

RALPH G. NILSON, *Primary Examiner.*

J. D. WALL, *Assistant Examiner.*